United States Patent [19]

Springer

[11] Patent Number: 4,952,688

[45] Date of Patent: Aug. 28, 1990

[54] WATER-SOLUBLE PHTHALOCYANINE COMPOUNDS

[75] Inventor: Hartmut Springer, Königstein/Taunus, Fed. Rep. of Germany

[73] Assignee: Hoechst Aktiengesellschaft, Frankfurt am Main, Fed. Rep. of Germany

[21] Appl. No.: 233,161

[22] Filed: Aug. 17, 1988

[30] Foreign Application Priority Data

Aug. 21, 1987 [DE]  Fed. Rep. of Germany ....... 3727909

[51] Int. Cl.$^5$ ............................................. C09B 47/04
[52] U.S. Cl. .................................... 540/134; 540/132; 540/133
[58] Field of Search .................... 540/132, 133, 134

[56] References Cited

U.S. PATENT DOCUMENTS

| | | | |
|---|---|---|---|
| 3,268,548 | 8/1966 | Heyna et al. | 260/314.5 |
| 3,409,633 | 11/1968 | Springer | 260/314.5 |
| 3,445,449 | 5/1969 | Meininger et al. | 540/132 X |
| 4,350,632 | 9/1982 | Springer | 260/314.5 |
| 4,576,755 | 3/1986 | Mischke et al. | 260/245.78 |
| 4,745,187 | 5/1988 | Springer | 540/133 X |

FOREIGN PATENT DOCUMENTS

| | | |
|---|---|---|
| 0043561 | 1/1982 | European Pat. Off. . |
| 0231837 | 8/1987 | European Pat. Off. . |
| 473881 | 7/1969 | Switzerland . |
| 2024837 | 1/1980 | United Kingdom . |

*Primary Examiner*—Richard L. Raymond

[57] ABSTRACT

Phthalocyanine compounds having fiber-reactive dye properties which dye hydroxyl- and/or carboxamido-containing material, in particular fiber material, such as cellulose fibers, wool and synthetic polyamide fibers, in fast and deep shades and which conform to the general formula (1)

$$Pc \begin{bmatrix} SO_2-N-(CH_2)_m- \phantom{X} -SO_2-Y \\ \phantom{XX} R \phantom{XXXXXXXXX} SO_3M \end{bmatrix}_a \begin{bmatrix} SO_2-N \diagup^{R^1}_{R^2} \end{bmatrix}_b [SO_3M]_c \quad (1)$$

where

Pc is the radical of copper- or nickel-phthalocyanine whose benzene nuclei can be substituted by chlorine or phenyl, R is a hydrogen atom or an alkyl group of 1 to 4 carbon atoms which can be substituted by a hydroxy, sulfato, cyano or sulfo group, M is a hydrogen atom or one equivalent of a salt-forming metal, preferably a hydrogen atom or an alkali metal, Y is a vinyl group or preferably a β-sulfatoethyl group, $R^1$ is a hydrogen atom or an alkyl group of 1 to 4 carbon atoms which can be substituted, and $R^2$ has one of the meanings of $R^1$ and is identical to $R^1$ or different from $R^1$ or $-NR^1 R^2$ together form a group of the formula (2)

$$\begin{matrix} -N-CN \\ | \\ M \end{matrix} \quad (2)$$

where

M has the abovementioned meaning, m is the number 1, 2, 3 or 4, a is an integral or fractional number from 1 to 4, b is an integral or fractional number from zero to 3, and c is an integral or fractional number form zero to 3, with the proviso that the sum of (a+b+c) is an integral or fractional number from 2 to 4, the sulfonamide and sulfo groups are each bonded to the carbocyclic aromatic rings of the phthalocyanine in the 3- and/or 4-position.

6 Claims, No Drawings

WATER-SOLUBLE PHTHALOCYANINE COMPOUNDS

Water-soluble phthalocyanine compounds, preparation thereof and use thereof as dyes.

The field of the invention is that of fiber-reactive phthalocyanine dyes.

U.S. Pat. Nos. 3,268,548 and 4,576,755 describe in the examples fiber-reactive phthalocyanine dyes substituted on the phthalocyanine radical by sulfo and sulfonamide groups, where the sulfonamide radical(s) contains (contain) as bonded units—directly or via an additional bridge member—a $\beta$-sulfatoethylsulfonyl or vinylsulfonyl-substituted phenyl or naphthyl radical. Dyes of a similar structure are known from U.S. Pat. No. 3,409,633, but they contain no sulfo group on the phthalocyanine nucleus. Furthermore, the examples of U.S. Pat. No. 4,350,632 describe fiber-reactive phthalocyanine dyes of a similar chemical structure which, owing to one or more sulfonylcyanamide groups, show improved solubility over the phthalocyanine dyes mentioned at the beginning.

All these known phthalocyanine dyes are generally highly suitable for the dyeing and printing of cellulose fibers by the application and fixing methods customary for fiber-reactive dyes. However, for specific processes, for example for the energy-saving continuous two-phase cold pad-batch process increasingly used of late in textile printing, they have certain disadvantages; for instance, their rate of fixation is too low for the minimum duration batching times at room temperature desired in this process, or they produce relatively weak and dull prints on regenerated cellulose fibers.

The present invention now provides novel phthalocyanine compounds which, besides very good coloristic properties, also have a rate of fixation appropriate for the printing process mentioned and produce prints of equal quality on cotton and staple viscose.

The phthalocyanine compounds according to the invention conform to the general formula (1)

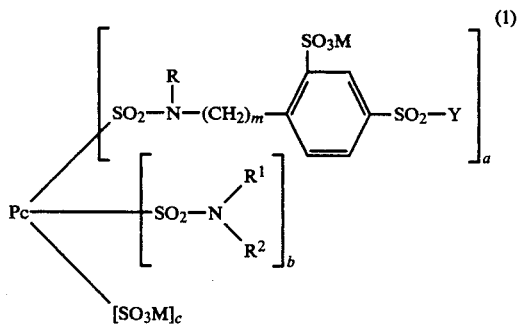

where:
Pc is the radical of copper- or nickel-phthalocyanine whose benzene nuclei can be substituted by chlorine or phenyl, R is a hydrogen atom or an alkyl group of 1 to 4 carbon atoms which can be substituted by a hydroxy, sulfato, cyano or sulfo group, such as, for example, a methyl, ethyl, $\beta$-hydroxyethyl, $\beta$-sulfatoethyl, $\beta$-cyanoethyl or $\beta$-carboxyethyl group, M is a hydrogen atom or one equivalent of a salt-forming metal, as of an alkaline earth metal, as of calcium, or preferably an alkali metal, such as sodium, potassium or lithium, Y is a vinyl group or preferably a $\beta$-sulfatoethyl group, $R^1$ is a hydrogen atom or an alkyl group of 1 to 4 carbon atoms which can be substituted, for example by a cyano, carboxy or sulfato group, and $R^2$ has one of the meanings of $R^1$ and is identical to $R^1$ or different from $R^1$ or —$NR^1 R^2$ together form a group of the formula (2)

where
M has the abovementioned meaning,
m is the number 1, 2, 3 or 4,
a is an integral or fractional number from 1 to 4,
b is an integral or fractional number from zero to 3 and
c is an integral or fractional number from zero to 3, with the proviso that the sum of (a+b+c) is an integral or fractional number from 2 to 4, the sulfonamide and sulfo groups are each bonded to the carbocyclic aromatic rings of the phthalocyanine in the 3- and/or 4-position.

Hereinbefore and hereinafter a sulfo group denotes a group conforming to the general formula —$SO_3M$, a carboxy group denotes a group of the general formula —COOM and a sulfato group denotes a group of the general formula —$OSO_3M$, in each of which M has one of the abovementioned meanings.

The phthalocyanine compounds according to the invention can be present in the form of their free acid and in the form of their salts, preferably alkali metal salts. They are used, preferably in the form of these salts, for dyeing or printing hydroxy- and/or carboxamidocontaining material, in particular fiber material.

From their synthesis the phthalocyanine compounds according to the invention are only in exceptional cases uniform compounds where the indices a, b and c represent integral numbers. In most cases, however, they are present in the form of mixtures of compounds of the formula (1), so that the indices a, b and c are average values and accordingly represent fractional numbers. The individual constituents of the mixture, i.e. the phthalocyanine compounds according to the invention, however, are always compounds having integral-numbered indices.

Preferred phthalocyanine compounds according to the invention conforming to the general formula (1) are those conforming to the general formula (3)

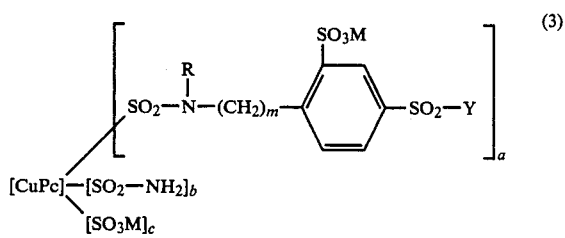

where CuPc denotes the radical of copper phthalcyanine to the carbocyclic aromatic rings of which the sulfo and sulfonamide groups are each bonded in the 3- and/or 4-position, Y, R, M and m have one of the abovementioned, in particular the preferred, meanings, and the indices a, b and c are as defined above, preferably have the meaning of one of the following groupings (3a) to (3e) in which their sum is a number from 2 to 4:

(3a): a=3, b=0, c=0;

(3b): a=2, b=0, c=0;

(3c): a=2, b=0, c=1;

(3d): a=2, b=1, c=1;

(3e): a=3, b=1, c=0.

Preference is given in particular to compounds of the general formula (3) where R is hydrogen, m is the number 2, Y is β-sulfatoethyl, a is a number between 2.1 and 2.4, preferably the number 2.2, or the number 3, and b and c both have the meaning of zero.

The present invention further provides a process for preparing a compound of the general formula (1) according to the invention, which comprises reacting a phthalocyaninesulfochloride of the general formula (4)

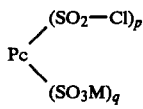   (4)

where

Pc and M have abovementioned meanings, M preferably being a hydrogen atom, p denotes an integral or fractional number from 2 to 4 and q stands for an integral or fractional number from zero to 2, the sum of (p+q) being an integral or fractional number from 2 to 4, with an amino compound of the general formula (5)

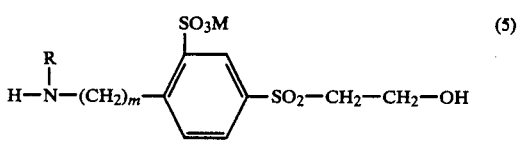   (5)

where R, M and m have the abovementioned meanings, and optionally with a further amino compound of the general formula $HNR^1R^2$ where $R^1$ and $R^2$ have the abovementioned meaning or with cyanamide, if in the formula (1) the group $-NR^1R^2$ stands for the radical of the formula (2), simultaneously or in any desired order, and converting the resulting phthalocyanine compound of the general formula (6)

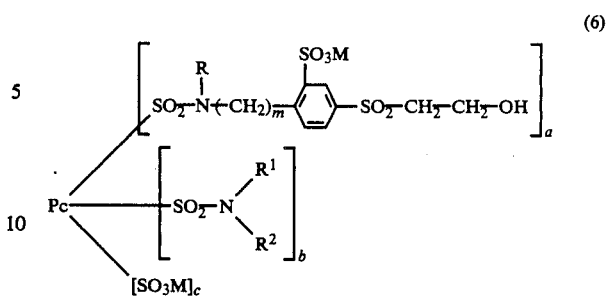

where R, Pc, M, m, $R^1$, $R^2$, a and b have the abovementioned meanings, with a sulfating agent into the sulfato compound of the general formula (1) where Y is a β-sulfatoethyl group and if desired converting said compound by treatment in an aqueous alkaline solution at a pH between 9 and 13 and at a temperature between 0° to 40° C. into a phthalocyanine compound of the general formula (1) where Y is a vinyl group.

The reaction of the phthalocyaninesulfochloride of the general formula (4) with the amino compound of the general formula (5) and optionally with the amino compound of the formula $HNR^1R^2$ or cyanamide is effected analogously to existing procedures for synthesizing sulfonamide-containing phthalocyanine compounds with or without sulfo groups. Such procedures are described for example in abovementioned U.S. Pat. Nos. 3,268,548, 3,409,633 and 4,350,632 and also in British Pat. No. 2,024,837 and in the references mentioned therein. Thus, the reaction is preferably effected in aqueous medium at a pH between 3.5 and 13, in particular preferably at a pH of 9 to 10, in the presence of an acid-binding agent, such as an alkali metal or alkaline earth metal hydroxide or an alkaline alkali metal or alkaline earth metal salt of an inorganic or organic acid such as sodium carbonate and secondary or tertiary sodium phosphate, at a temperature of between 0° and 80° C., preferably between 0° and 40° C. The reaction can also be carried out in an aqueous organic medium, in which case the organic medium can serve to improve the solubility of the reactants in the aqueous reaction medium; the organic solvent component is preferably an amide of an aliphatic carboxylic acid, such as dimethylformamide or N-methylpyrrolidone.

To speed up the reaction, it is preferably carried out in the presence of a tertiary organic base, such as, for example, pyridine or derivatives of pyridine, such as 3-methylpyridine, nicotinic acid or nicotinamide.

Depending on the reaction conditions, a certain proportion of the sulfonyl chloride groups in the starting compounds of the general formula (4) or already existing condensation intermediate products thereof can be hydrolyzed to sulfo groups. The hydrolysis of the sulfonyl chloride groups to sulfo groups can be effected or carried out simultaneously with the reaction of the amino compounds (including cyanamide) or after the reaction of the sulfonyl chloride groups with the amino compounds. Any sulfonyl chloride groups which have not reacted with the amino compounds can be hydrolyzed subsequently, preferably in an acid or weakly alkaline medium, for instance at a pH between 1 and 8, and for example at a temperature between 20° and 60° C.

The conversion of the β-hydroxyethylsulfonyl-substituted phthalocyanine compounds of the general formula (6) according to the invention to the β-sulfatoethylsulfonyl compounds thereof according to the invention is likewise effected analogously to the procedures described in the references mentioned, such as, for example, by means of 96 to 100% strength sulfuric acid or $SO_3$-containing sulphuric acid, such as up to 35% strength oleum, at a temperature between 0° and 60° C. It is also possible to use for this purpose other sulfating agents described in the literature, such as, for example, chlorosulfonic acid and sulfamic acid.

In these sulfation reactions it is possible, depending on the esterification conditions chosen, for side reactions to occur, if the group $—NR^1R^2$ stands for a group of the formula (2), to the effect that a small proportion of the sulfonylcyanamide groups is for example converted into sulfonylurea groups or further modified. These side reactions, however, do not impair the quality of the phthalocyanine compounds of the general formula (1) according to the invention.

The starting compounds of the general formula (4) are known and numerously described in the literature, as for example in the abovementioned British Patent Application of publication No. 2,024,837A. The amino compounds of the general formula (5) are preparable in the conventional manner by sulfonating the corresponding sulfo-free compounds or acyl derivatives thereof.

The separation and isolation of compounds (1) prepared according to the invention from the synthesis batches is effected in a commonly known manner either by precipitation from the reaction medium by means of electrolytes, such as, for example, sodium chloride or potassium chloride, and subsequent filtration or by evaporation of the reaction solution, for example by spray drying thereon; here a buffer substance may be added to the reaction solution.

The compounds of the general formula (1) according to the invention, hereinafter referred to as compounds (1), have fiber-reactive properties and possess very good dye properties. They can therefore be used for dyeing hydroxy- and/or carboxamido-containing materials, in particular fiber material, but also leather. Similarly, the solutions obtained in the synthesis of the compounds according to the invention can be used in dyeing directly as liquid formulations with or without the addition of a buffer substance, with or without prior concentrating or partial demineralization.

The present invention therefore also provides the use of the compounds of the general formula (1) according to the invention for dyeing hydroxy- and/or carboxamido-containing materials, more specifically processes for their application to these substrates. This includes mass coloration, for example of films made of polyamide, and dyeing by printing. Preferably, the materials are used in the form of fiber materials, in particular in the form of textile fibers, such as yarns, packages and fabrics. Hydroxy-containing materials are natural or synthetic hydroxy-containing materials, such as, for example, cellulose fiber materials or regenerated products thereof, and polyvinyl alcohols. Cellulose fiber materials are preferably cotton but also other vegetable fibers, such as linen, hemp, jute and ramie fibers, while regenerated cellulose fibers are for example staple viscose and filament viscose. Carboxamido-containing materials are for example synthetic and natural polyamides and polyurethanes, in particular in the form of fibers, for example wool or other animal hairs, silk, leather, nylon-6.6, nylon-6, nylon-11 and nylon-4.

The compounds according to the invention are applicable to and fixable on the substrates mentioned, in particular the fiber materials mentioned, by the application techniques known for water-soluble dyes, in particular for fiber-reactive dyes, such as, for example, by the customary exhaust and padding methods and also the customary printing methods. Such methods are described in the literature, including the patent literature, as for example in abovementioned GB-A-2,024,837 or European Patent Application of publication No. 0,218,131 A1.

It is particularly advantageous to use the phthalocyanine compounds according to the invention in the customary pad-steam, cold pad-batch and pad-thermofix processes, since they possess a high rate of fixation and are fixed on the material, such as fiber material, within a relatively short time. They show in particular in the continuous two-phase cold pad-batch processes, especially if used for printing, advantages over the known phthalocyanine compounds on account of their appreciably higher rate of fixation.

Applied by the dyeing and printing methods mentioned, the novel phthalocyanine compounds give rise to useful turquoise blue dyeings and prints which are notable in particular for very good fastness properties, in particular very good light and wet fastness properties, such as, for example, wash, perspiration, acid and alkali fastness properties.

The Examples which follow serve to illustrate the invention. The parts and percentages are by weight, unless otherwise stated. Parts by weight relate to parts by volume as the kilogram relates to the liter.

The compounds described in the Examples by formulae have been written in the form of the free acids; in general, they are prepared and isolated in the form of their alkali metal salts and used for dyeing in the form of these salts. Similarly, the starting compounds and components mentioned in the Examples, in particular the Table Examples, in the form of the free acids can be used in the synthesis as such or in the form of their salts, preferably alkali metal salts such as sodium or potassium salts. The absorption maxima ($\lambda_{max}$ values) in the visible region mentioned in the Examples for the compounds according to the invention were determined from their alkali metal salts in aqueous solution.

EXAMPLE 1

105 parts of 2-(2-aminoethyl)-5-(2-hydroxyethylsulfonyl)-benzenesulfonic acid (see Example A below) are suspended in 170 parts of water. 87 parts of copper phthalocyanine-3-trisulfochloride are then added with stirring in the form of a moist filtercake, the batch is brought to pH 10 with sodium hydroxide solution and heated to 50° C., and the reaction is continued with stirring at 50° C. for about 8 hours, until the reaction has ended, while the pH is maintained at 10. Thereafter the batch is brought with sulfuric acid to pH 7.0, and the synthesis solution is evaporated by spray drying.

The dry condensation product is slowly added below 50° C. to a mixture of 667 parts of 100% strength sulfuric acid and 134 parts of 20% strength oleum (=800 parts of 3.5% strength oleum) and stirred in at 50° C. until completely dissolved, and the solution is then stirred into a mixture of ice and an aqueous potassium chloride solution. The precipitated product is filtered off with suction and washed with an aqueous potassium chloride solution. The moist residue is then stirred into water at pH 5 set with sodium hydrogencarbonate, and the solution obtained is conventionally clarified and spray-dried.

The result obtained is a dark blue powder which contains electrolyte salt (such as potassium chloride and sodium chloride) and comprises an alkali metal salt, predominantly the sodium salt, of a compound conforming to the formula

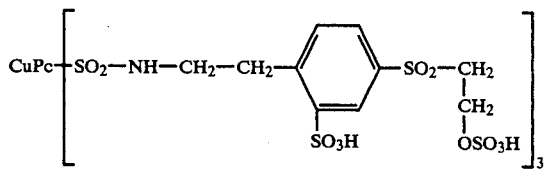

($\lambda_{max}$ = 664 nm).

The compound according to the invention shows very good fiber-reactive dye properties and, applied by the application and fixing methods customary for fiber-reactive dyes, including advantageously by the application methods customary for rapid-fixing fiber-reactive dyes, provides turquoise blue dyeings and prints having very good fastness properties, such as in particular very good light and wet fastness properties, of which the wash, perspiration, acid and alkali fastness properties are particularly notable.

EXAMPLE A

The starting compound 2-(2-aminoethyl)-5-(2-hydroxyethylsulfonyl)benzenesulfonic acid can be prepared as follows: [4-(2-acetylaminoethyl)]-(2-hydroxyethylsulfonyl)benzene, described in U.S. Pat. No. 3,268,548, is sulfonated with 40% strength oleum at 70° C. for 5 hours. The batch is then diluted with water, and the acetylamino group is hydrolyzed by boiling this acid solution for 4 hours. On cooling down, the desired compound precipitates. It is filtered off, washed and dried.

Analysis (based on $C_{10}H_{15}NO_6S_2$; MW=309):
calculated: C 38.83%, H 4.85%, N 4.53%, S 20.71%;
found: C 38.5 %, H 5.2 %, N 4.4 %, S 20.6%.
Melting point: 313°–316° C. (with decomposition).

EXAMPLE 3

62 parts of 2-(2-aminoethyl)-5-(2-hydroxyethylsulfonyl)-benzenesulfonic acid are dissolved in 500 parts of water with the addition of 41 parts by volume of 16.5% strength aqueous sodium hydroxide solution. 30 parts by volume of 25% strength aqueous ammonia solution are added, followed immediately by 97 parts of copper phthalocyanine-3-tetrasulfochloride in the form of a moist filtercake. The reaction mixture is brought to pH 12 with sodium hydroxide solution and is maintained at that pH with stirring and at room temperature by the uninterrupted addition of sodium hydroxide solution. The reaction has ended when no further alkali is consumed. 70 parts of sodium sulfate are then added, and the reaction batch is acidified with sulfuric acid. The precipitated product is filtered off and dried.

It is then added to 210 parts by volume of sulfuric acid (monohydrate). The mixture is stirred at 50° C. for 2 hours and is then added with stirring to a mixture of 1,000 parts by volume of a saturated aqueous sodium chloride solution and 1,000 parts of ice, while the temperature should not exceed 10° C. The precipitated product is filtered off and washed with a saturated aqueous sodium chloride solution. The moist residue is dissolved in 500 parts of water at a pH of 5 to 6 by means of sodium hydrogencarbonate, and the solution is then spray-dried.

The result obtained is a dark blue, electrolyte-containing powder of the sodium salt of a compound mixture conforming to the formula

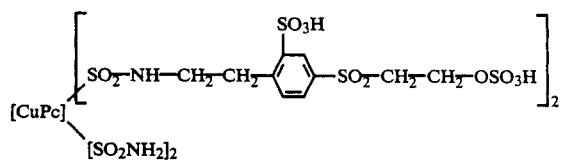

($\lambda_{max}$ = 612 nm)

which has very good fiber-reactive dye properties and, applied by the application and fixing methods customary for fiber-reactive dyes, produces turquoise blue dyeings and prints having similar properties as described for the copper phthalocyanine compound of Example 1 according to the invention.

EXAMPLES 3 TO 32

The Table Examples below describe further compounds according to the invention with the aid of the general formula (1). They can be prepared in a manner according to the invention, for example according to one of the above working examples, by means of the amine component(s) shown in the particular Table Example and a sulfo-free or sulfo-containing phthalocyaninesulfochloride conforming to the general formula (4), such as a phthalocyanine-sulfochloride indicated in the particular Table Example. They possess very good fiber-reactive dye properties and, applied by the application and fixing methods customary for fiber-reactive dyes, produce on the materials mentioned in the description, in particular on cellulose fiber materials, strong and fast dyeings and prints in the hue indicated in the particular Table Example for dyeings on cotton.

| | Pc sulfochloride (3) | | | Compound (1) | | | | | | |
|---|---|---|---|---|---|---|---|---|---|---|
| Ex. | p | q | R | m | $R^1$ | $R^2$ | a | b | c | Hue ($\lambda_{max}$) |
| 3 | 4 | 0 | Hydrogen | 2 | – | – | 4 | 0 | 0 | turquoise blue (666) |
| 4 | 3 | 0 | Hydrogen | 2 | – | – | 2 | 0 | 1 | turquoise blue (665) |
| 5 | 2.2 | 0 | Hydrogen | 2 | – | – | 1.5 | 0 | 0.7 | turquoise blue (621) |
| 6 | 2.2 | 0 | Hydrogen | 2 | Hydrogen | Cyano | 1.5 | 0.7 | 0 | turquoise blue (617) |
| 7 | 3 | 1 | Hydrogen | 2 | – | – | 3 | 0 | 1 | turquoise blue (668) |
| 8 | 4 | 0 | Hydrogen | 2 | – | – | 2.5 | 0 | 1.5 | turquoise |

-continued

| | Pc sulfochloride (3) | | | Compound (1) | | | | | | |
|---|---|---|---|---|---|---|---|---|---|---|
| Ex. | p | q | R | m | $R^1$ | $R^2$ | a | b | c | Hue ($\lambda_{max}$) |
| 9 | 3 | 0 | Hydrogen | 2 | – | – | 1.5 | 0 | 1.5 | blue (665) turquoise blue (664) |
| 10 | 2 | 0 | Methyl | 1 | – | – | 2 | 0 | 0 | turquoise blue |
| 11 | 2 | 0 | Hydrogen | 1 | – | – | 2 | 0 | 0 | turquoise blue |
| 12 | 3 | 0 | Hydrogen | 2 | Hydrogen | Cyano | 1.5 | 1.5 | 0 | turquoise blue (662) |
| 13 | 4 | 0 | Hydrogen | 2 | Hydrogen | Cyano | 1.5 | 2.5 | 0 | turquoise blue (664) |
| 14 | 4 | 0 | Hydrogen | 2 | Hydrogen | Cyano | 2 | 2 | 0 | turquoise blue (668) |
| 15 | 3 | 0 | Hydrogen | 2 | Hydrogen | Cyano | 2 | 1 | 0 | turquoise blue (666) |
| 16 | 4 | 0 | Hydrogen | 2 | – | – | 1.5 | 0 | 2.5 | turquoise blue (666) |
| 17 | 4 | 0 | Hydrogen | 2 | Methyl | β-Sulfato-ethyl | 2 | 2 | 0 | turquoise blue |
| 18 | 2 | 0 | Hydrogen | 2 | β-Sulfato-ethyl | β-Sulfato-ethyl | 1 | 1 | 0 | turquoise blue |
| 19 | 4 | 0 | Hydrogen | 2 | Hydrogen | Ethyl | 2 | 2 | 0 | turquoise blue |
| 20 | 4 | 0 | Hydrogen | 2 | Hydrogen | γ-Carboxy-propyl | 2 | 1 | 1 | turquoise blue |
| 21 | 4 | 0 | Hydrogen | 2 | Hydrogen | β-Sulfo-ethyl | 2 | 2 | 0 | turquoise blue |
| 22 | 4 | 0 | Hydrogen | 4 | – | – | 2 | 0 | 2 | turquoise blue |
| 23 | 2 | 0 | Hydrogen | 4 | – | – | 2 | 0 | 0 | turquoise blue |
| 24 | 2 | 0 | Ethyl | 4 | – | – | 2 | 0 | 0 | turquoise blue |
| 25 | 4 | 0 | Hydrogen | 4 | Hydrogen | β-Carboxy-ethyl | 2 | 2 | 0 | turquoise blue |
| 26 | 4 | 0 | Methyl | 2 | – | – | 2 | 0 | 2 | turquoise blue |
| 27 | 4 | 0 | Methyl | 2 | Methyl | β-Sulfato-ethyl | 2 | 2 | 0 | turquoise blue |
| 28 | 4 | 0 | Methyl | 2 | Methyl | β-Sulfato-ethyl | 2 | 1 | 1 | turquoise blue |
| 29 | 4 | 0 | Ethyl | 2 | – | – | 2 | 0 | 2 | turquoise blue |
| 30 | 4 | 0 | Ethyl | 2 | Methyl | γ-Sulfato-propyl | 2 | 2 | 0 | turquoise blue |
| 31 | 4 | 0 | Ethyl | 2 | Methyl | β-Sulfato-ethyl | 2 | 1 | 1 | turquoise blue |
| 32 | 2.2 | 0 | Hydrogen | 2 | – | – | 2.2 | 0 | 0 | turquoise blue (625) |

USE EXAMPLE 20 parts of the copper phthaloclyanine-62-sulfatoethylsulfonyl compound of Example 1 according to the invention are dissolved together with 50 parts of urea in 200 parts of hot water. This solution is admixed with stirring with 500 parts of a thickening comprising 40 parts of a commercially available alginate thickener, 10 parts of a polyphosphate, 50 parts of a commercially available emulsifier and 900 parts of water. The paste obtained is standardized with water and further alginate thickening to 1,000 parts.

This print paste is used to print a cotton fabric. The print is dried at about 60° C. and then padded with an aqueous fixing solution which contains per liter 180 g of anhydrous sodium sulfate, 50 g of anhydrous potassium carbonate, 150 g of anhydrous sodium carbonate and 100 ml of 33% strength aqueous sodium hydroxide solution. The padded fabric is air-passed for 20 to 40 seconds, plaited or wound on a beam and, following a dwell time of 20 to 30 minutes at a temperature of 20° C., is finished by rinsing with cold and hot water, by soaping at the boil, by rinsing again with hot and cold water and then drying. This two-phase cold pad-batch process produces a deep turquoise blue print pattern of good light and wash fastness.

COMPARATIVE EXAMPLE

The copper phthalocyanine-8-sulfatoethylsulfonyl dye of Example 1 according to the invention, hereinafter referred to as dye (A), is compared with the known dyes (B), (C) and (D) as regards application properties (in the formulae, M is always an alkali metal):

Dye (B):

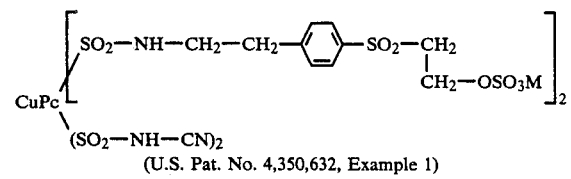

(U.S. Pat. No. 4,350,632, Example 1)

Dye (C):

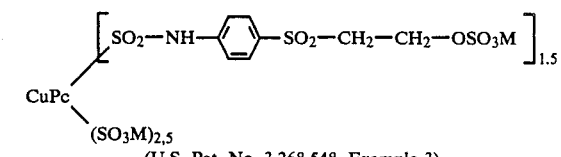

(U.S. Pat. No. 3,268,548, Example 3)

Dye (D):

-continued

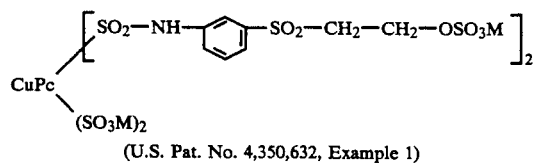

(U.S. Pat. No. 4,350,632, Example 1)

(a) Experimental procedure:

A fabric of mercerized cotton and a fabric of staple viscose were each roller printed with an aqueous print paste which contained a neutral alginate thickening and to 1,000 parts in each case 50 parts of one of the dyes (A) to (D) in solution. The printed and subsequently dried fabric was then padded with an aqueous fixing liquor containing per 1,000 parts by volume 180 parts of anhydrous sodium sulfate, 150 parts of calcined sodium carbonate, 50 parts of anhydrous potassium carbonate and 100 ml of 33% strength aqueous sodium hydroxide solution at 20° C. to a liquor pickup of 80%, based on the weight of fiber. The padded fabric was then air-passed for 20 seconds, plaited and left to dwell in the covered state for various times, namely 5 minutes, 10 minutes, 20 minutes and 60 minutes. The prints were subsequently finished by rinsing with cold water, by washing at 60° C. with an aqueous bath containing a neutral detergent, by rinsing once more with cold water and by drying.

(b) Evaluation:

The tinctorial strengths of the prints obtained as a function of the dwell time were measured in a spectrophotometer. The comparison used in each case was a print obtained by the one-phase steaming process (fixation of the print prepared with a sodium bicarbonate-containing print paste by means of saturated steam at 102° to 103° C. for 4 minutes) whose tinctorial strength was in each case set to 100% as a standard: relative tinctorial strength (in %):

(a) on cotton:

| Dye | one-phase process | two-phase process; fixing time | | | |
|---|---|---|---|---|---|
| | | 5 min | 10 min | 20 min | 60 min |
| (A) | 100 | 101 | 107 | 110 | 110 |
| (B) | 100 | 79 | 84 | 90 | 91 |
| (C) | 100 | 29 | 43 | 65 | 75 |
| (D) | 100 | 22 | 31 | 47 | 66 |

(b) on caustisized stable viscose:

| (A) | 100 | 85 | 100 | 105 | 105 |
|---|---|---|---|---|---|
| (B) | 100 | 62 | 69 | 75 | 76 |
| (C) | 100 | 15 | 23 | 33 | 42 |
| (D) | 100 | 8 | 11 | 15 | 21 |

What is claimed is:

1. A compound conforming to the general formula

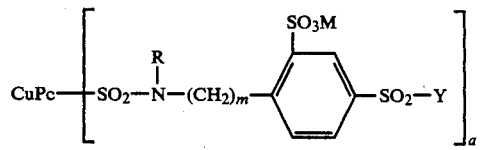

wherein:
CuPc is a radical of copper phthalocyanine whose benzene nuclei can be substituted by chlorine or phenyl,
R is a hydrogen atom,
M is a hydrogen atom or an alkali metal,
Y is a β-sulfatoethyl group
m is the number 1, 2, 3 or 4, and
a is an integral or fractional number from 2 to 3.

2. A compound as claimed in claim 1, wherein a is the number 3.

3. A compound as claimed in claim 1, wherein a is the number 2.

4. A compound as claimed in claim 1 wherein m is the number 2.

5. A compound as claimed in claim 1, wherein m is 2, and a is a number ranging from 2.1 to 2.4.

6. A compound as claimed in claim 5, wherein a is 2.2.

* * * * *